United States Patent [19]

Englin et al.

[11] Patent Number: 5,860,093
[45] Date of Patent: Jan. 12, 1999

[54] REDUCED INSTRUCTION PROCESSOR/ STORAGE CONTROLLER INTERFACE

[75] Inventors: Donald C. Englin, Shoreview; Mitchell A. Bauman, Circle Pines, both of Minn.

[73] Assignee: Unisys Corporation, Blue Bell, Pa.

[21] Appl. No.: 785,873

[22] Filed: Jan. 21, 1997

[51] Int. Cl.[6] .................................................. G06F 12/00
[52] U.S. Cl. ........................ 711/118; 711/124; 711/128; 711/167; 711/169; 395/280; 365/227
[58] Field of Search ............... 711/124, 3, 167, 711/118, 123, 128, 169, 122, 140, 146, 202, 119, 211, 100, 131; 395/280, 381, 49, 308; 365/189.01, 227; 364/200, 489; 707/201; 371/40.2

[56] References Cited

U.S. PATENT DOCUMENTS

| | | | |
|---|---|---|---|
| 4,056,844 | 11/1977 | Izumi | 364/200 |
| 4,130,865 | 12/1978 | Heart et al. | 364/200 |
| 4,349,871 | 9/1982 | Lary | 364/200 |
| 4,426,681 | 1/1984 | Bacot et al. | 364/200 |
| 4,442,487 | 4/1984 | Fletcher et al. | 364/200 |
| 4,445,174 | 4/1984 | Fletcher | 364/200 |
| 4,521,851 | 6/1985 | Trubisky et al. | 364/200 |
| 4,525,777 | 6/1985 | Webster et al. | 364/200 |
| 4,551,799 | 11/1985 | Ryan et al. | 364/200 |
| 4,586,133 | 4/1986 | Steckler | 364/200 |
| 4,667,288 | 5/1987 | Keeley et al. | 364/200 |
| 4,701,844 | 10/1987 | Thompson et al. | 364/200 |
| 4,707,784 | 11/1987 | Ryan et al. | 364/200 |
| 4,719,568 | 1/1988 | Carrubba et al. | 364/200 |
| 4,755,930 | 7/1988 | Wilson, Jr. et al. | 364/200 |
| 4,794,521 | 12/1988 | Ziegler et al. | 364/200 |
| 4,807,110 | 2/1989 | Pomerene et al. | 364/200 |
| 4,843,542 | 6/1989 | Dashiell et al. | 364/200 |
| 4,860,192 | 8/1989 | Sachs et al. | 364/200 |
| 4,984,153 | 1/1991 | Kregness et al. | 364/200 |
| 4,985,829 | 1/1991 | Thatte et al. | 364/200 |
| 4,992,930 | 2/1991 | Gilfeather et al. | 364/200 |
| 4,992,934 | 2/1991 | Portanova et al. | 364/200 |
| 5,023,776 | 6/1991 | Gregor | 364/200 |

(List continued on next page.)

OTHER PUBLICATIONS

Dubois et al., "Effects of Cache Coherency in Multiprocessors", *IEEE Transactions on Computers*, vol. C–31, No. 11, Nov. 1982, pp. 1083–1099.

Wilson, Jr., "Hierarchical Cache/Bus Architecture for Shared Memory Multiprocessors", *IEEE*, 1987, pp. 244–252.

Sparacio, "Data Processing System With Second Level Cache", *IBM Technical Disclosure Bulletin*, vol. 21, No. 6, Nov. 1978, pp. 2468–2469.

Myers et al., *The 80960 Microprocessor Architecture*, 1988, pp. 159–183.

Hinton et al., "Microarchitecture of the 80960 High–Integration Processors", Proceedings of the 1988 IEEE International Conference on Computer Design: VLSI in Computers and Processors — ICCD, 1988, pp. 362–365.

Bandyopadhyay et al., "Combining Both Micro–Code and Hardwired Control in RISC", *Computer Architecture News*, 1990, pp. 11–15.

Bandyopadhyay et al., "Micro–Code Based RISC Architecture", 19th Southeastern Symposium on System Theory, Mar. 1987, pp. 411–414.

*Primary Examiner*—Tod R. Swann
*Assistant Examiner*—Mehdi Namazi
*Attorney, Agent, or Firm*—Nawrocki, Rooney & Sivertson, P.A.

[57] ABSTRACT

Method and apparatus for reducing address/function transfer pins in a system where cache memories in a system controller are accessed by a number of instruction processors. The reduction of pins is obtained by using two data transfers. The increase in data addressing time, which would otherwise occur using two data transfers, is reduced to nearly the time of the data transfers themselves by responding to the first data transfer while the second data transfer is taking place.

12 Claims, 10 Drawing Sheets

U.S. PATENT DOCUMENTS

| | | | |
|---|---|---|---|
| 5,025,364 | 6/1991 | Mathur et al. | 364/200 |
| 5,025,366 | 6/1991 | Baror | 364/200 |
| 5,029,070 | 7/1991 | McCarthy et al. | 364/200 |
| 5,058,006 | 10/1991 | Durdan et al. | 364/200 |
| 5,095,424 | 3/1992 | Woffinden et al. | 395/425 |
| 5,136,696 | 8/1992 | Beckwith et al. | 395/375 |
| 5,148,533 | 9/1992 | Joyce et al. | 395/425 |
| 5,193,163 | 3/1993 | Sanders et al. | 395/425 |
| 5,197,139 | 3/1993 | Emma et al. | 395/400 |
| 5,206,945 | 4/1993 | Nishimukai et al. | 395/425 |
| 5,212,781 | 5/1993 | Shah | 395/425 |
| 5,222,224 | 6/1993 | Flynn et al. | 395/425 |
| 5,222,244 | 6/1993 | Carbine et al. | 395/800 |
| 5,241,641 | 8/1993 | Iwasa et al. | 711/122 |
| 5,265,232 | 11/1993 | Gannon et al. | 395/425 |
| 5,265,235 | 11/1993 | Sindhu et al. | 395/425 |
| 5,276,848 | 1/1994 | Gallagher et al. | 395/425 |
| 5,307,477 | 4/1994 | Taylor et al. | 395/425 |
| 5,313,602 | 5/1994 | Nakamura | 395/425 |
| 5,355,467 | 10/1994 | MacWilliams et al. | 395/425 |
| 5,359,723 | 10/1994 | Matthews et al. | 395/425 |
| 5,386,547 | 1/1995 | Jouppi | 395/425 |
| 5,392,416 | 2/1995 | Doi et al. | 395/425 |
| 5,423,016 | 6/1995 | Tsuchiya et al. | 395/425 |
| 5,490,261 | 2/1996 | Bean et al. | 395/448 |
| 5,524,233 | 6/1996 | Milburn et al. | 395/468 |
| 5,555,382 | 9/1996 | Thaller et al. | 395/293 |
| 5,577,228 | 11/1996 | Banerjee et al. | 711/140 |
| 5,577,259 | 11/1996 | Alferness et al. | 395/800 |
| 5,603,005 | 2/1997 | Bauman et al. | 711/124 |
| 5,701,313 | 12/1997 | Purdham | 371/40.2 |
| 5,717,942 | 2/1998 | Haupt et al. | 364/489 |

ADDRESS FORMAT

| 0 | 1 | 2 | 3 | 4 | 5 | 6 | 7 | 8 | 9 | 10 | 11 | 12 | 13 | 14 | 15 | 16 | 17 | 18 | 19 | 20 | | |
|---|---|---|---|---|---|---|---|---|---|---|---|---|---|---|---|---|---|---|---|---|---|---|
| 0 | F1 | F2 | F3 | A27 | A28 | A37 | A38 | A39 | A40 | A41 | A42 | A43 | A44 | A45 | A46 | A47 | A48 | A49 | A50 | A51 | 1ST MINOR CYCLE |
| F4 | F5 | F6 | A21 | A22 | A23 | A24 | A25 | A26 | 0 | A29 | A30 | A31 | A32 | A33 | A34 | A35 | A36 | 0 | A52 | A53 | 2ND MINOR CYCLE |

FIG. 2A

REDUCED INSTRUCTION PROCESSOR/ STORAGE CONTROLLER INTERFACE

CROSS REFERENCE TO CO-PENDING APPLICATIONS

The present application is related to U.S. patent application Ser. No. 08/748,772, filed Nov. 14, 1996, entitled "Selectable Two-Way Four-Way Double Cache Interleave Scheme", assigned to the assignee of the present invention and incorporated herein by reference.

BACKGROUND OF THE INVENTION

1. Field of the Invention

The present invention relates to general purpose digital data processing systems, and more particularly to such systems that employ second level caches accessed by a plurality of users over data lines.

2. Description of the Prior Art

In modern high performance data processing systems, significant performance enhancements can be achieved by using the concept of parallelism. Parallelism allows multiple things to occur simultaneously. This may reduce the effects of performance inhibitors such as queuing times that are typically associated with shared resources. Parallelism, however, often requires dedicated interfaces, and thus results in an increase in the number of I/O signals required within the system.

As integrated circuit technology advances, more and more logic can be housed within a single chip. Having more logic within a single chip can result in interface problems if the chip does not have enough I/O pins to provide for all of the input and output signals that are required. In a growing number of cases, there are too few pins to provide dedicated interfaces for all of the desired signals.

Multiprocessor systems that have an instruction processor and a storage controller typically have a function/address interface extending therebetween. In some industry standard systems, the instruction processor interfaces to the storage controller via a dedicated function/address bus, which is a highly parallel connection. In this configuration, the instruction processor may provide the entire address to the storage controller at the beginning of each memory access. This may allow the memory access to be completed in the minimum amount time, at least relative to the shared bus approach, but is typically a relatively expensive solution in terms of I/O pins and interconnect traces.

To overcome these limitations, some systems utilize a serial function/address bus, which is a highly serialized connection. Because the function/address bus is highly serialized, it provides a low cost interface, at least in terms of the number of I/O pins and interconnect, but typically does not provide high performance. Further, as more instruction processors are added to the multiprocessor system, there is typically more contention for the bus and the overall system performance may decrease.

It has been recognized that the optimum design goal may be to maximize the parallelism where it has the most effect on performance, and reduce the parallelism where it has the least affect performance. The result may reduce the number of I/O pins while still providing the desired performance. Thus, it would be desirable to achieve a function/address interface that has the same performance as the fully parallel designs, but with substantially less interconnect.

SUMMARY OF THE INVENTION

The present invention contemplates providing an instruction processor and a storage controller, with a function/ address bus extending therebetween. The function/address bus has a width that is essentially one-half that of the function/address bus of a fully parallel system. In this configuration, the number of input/output pins in the instruction processor and storage controller may be reduced, and the number of interconnect lines therebetween may be similarly reduced.

To achieve performance levels that are similar to that of a fully parallel system, the present invention contemplates providing a multiplexed function/address interface, with the transfer of information occurring over two transfers rather than one. The storage controller of the present invention includes a tag memory and a cache memory, wherein the tag memory is used to determine if the requested data is in the cache memory. In such a configuration, it typically requires two clock cycles to access the storage controller; one for accessing the tag memory, and the other to compare the tag memory results with the requested address to determine if a cache hit is detected, and further to read out the requested data if a cache hit is detected.

In accordance therewith, a preferred embodiment of the the present invention divides the information that is required to access the storage controller into two approximately equal portions. The first portion includes the information that is used to access the tag memory. The second portion includes the requested address which is compare to the results of the tag memory access to determine if a cache hit is detected, and to read out the requested data if a cache hit is detected. Thus, it is contemplated that the present invention may utilize a just in time type of algorithm, providing high performance while reducing the number of I/O pins required.

BRIEF DESCRIPTION OF THE DRAWINGS

Objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2A shows the address format for the two cycle function/address transfer;

DETAILED DESCRIPTION OF THE PREFERRED EMBODIMENT

Figure 1:
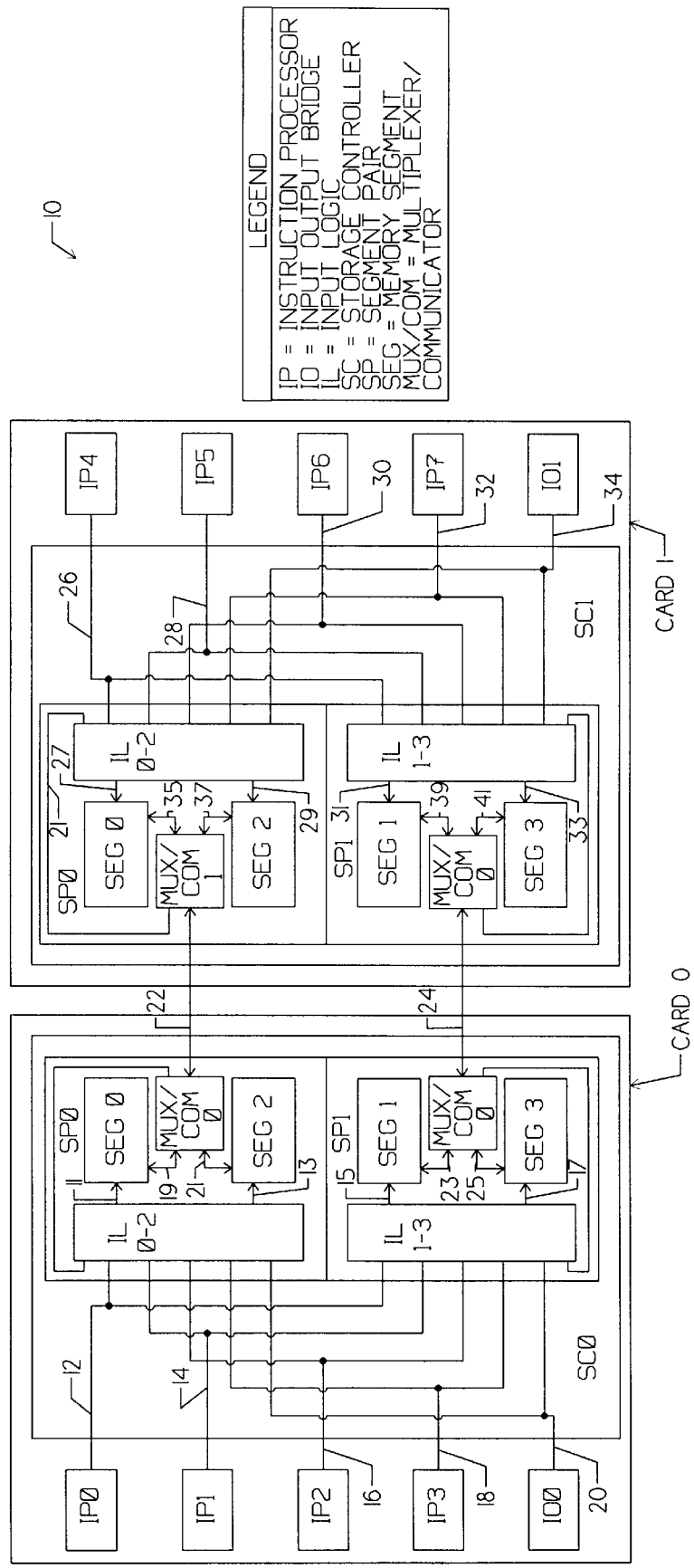
FIG. 1 is a block diagram of a fully populated data processing system incorporating the present invention.

The embodiment used to illustrate the present invention includes an instruction processor and a storage controller, with a function/address bus extending therebetween. In the illustrative embodiment, a storage controller access requires the transfer of forty bits of information between each instruction processor and its associated storage controller. The number of pins required on the storage controller for this transfer is reduced by a factor of two, relative to a strictly parallel interface, by using a multiplexed address/function interface, and the information is transferred using two transfers rather than one. The additional time required for the second transfer does not negatively impact the performance of the storage operation because of the storage controller design. The storage controller allows the access information to be provided in two successive clock cycles, wherein only a first part of the access information is required during the first clock cycle. The second part of the access information is not required until the second clock cycle.

In a preferred embodiment, each function/address interface between the instruction processor and storage controller is 21 bits wide. Two transfers are required to transfer the 40 bits of function code and address across the 21-bit interface. Input logic in the storage controller receives and latches the two function/address transfers. After the first transfer is latched, a routing process begins. The SC immediately routes the request for service to one of four second level cache servers. These cache servers are fully independent and operate in parallel. The server that is selected is based on the decode of two address bits within the first transfer. The particular two address bits that are used for the decode is dependent on a predetermined function of the type of interleave selected (see FIG. 2A–2E). The interleave selection is scanned into the storage controller at initialization time. A preferred embodiment provides for multiple types of interleave. Since each cache server operates only on requests for a certain segment of the address range, it is also referred to as a cache segment.

Preferably, the cache segment requires two parts of an address in order to operate as a standard set associative cache. The first part, known as a set address, is used to access a directory RAM structure that contains tag information on the cache lines that are resident in the associated cache data buffer. The set addresses are 10 bits in size for the preferred implementation. The second part is known as the block address. This part of the requested address is used to compare against the contents of the directory, in order to determine whether or not the cache line is resident in the cache data buffer. Since the directory RAM requires a clock cycle to access this stored tag information, the block address portion of the requested address is not required to be present at the start of the directory search. Therefore, delaying the delivery of the block address portion by one clock cycle has no negative impact on the performance of a storage controller access.

In the preferred implementation, there are two types of second level caches (SLC) that operate in tandem, an instruction SLC and an operand SLC. In both cases, they are divided into independent cache servers on a segmented address basis, as described above. Each of these cache types has a separate directory and cache data buffer. Also, each type has a different cache line size relative to the directory tag information. The instruction SLC has a pseudo 32-word cache line size, while the operand has an 8-word cache line size. Therefore, given a total system memory address range of 33 bits, a four segmented cache server scheme, a 10-bit set address and the two different cache line sizes implies that the block address part is 16 bits in size for the instruction SLC and 18 bits in size for the operand SLC.

The SLC director and associate data caches are organized as four blocks per set using a standard set associative cache structure. This means that a simultaneous four-way comparison is made during the directory search sequence. If the search fails, (i.e. no tag comparisons were found), it indicates a cache miss condition. This cache miss condition will cause the function/address information to be transferred to a remote storage controller, if present in the system.

The function/address transfer has the same two part transfer method as described above. The address information is used by the remote storage controller to check its SLC directory, using the same comparison approach. If the data is available in the remote SLC, it is then transferred back to the requester and also made resident in the local SLC. If the requested address is in neither SLC, then a reference is used to the appropriate MSU, where the data is fetched, transferred to the requester, and then made resident in the local SLC for future references.

Data transfers between the storage controller and the instruction processor are done in an 8-word burst fashion, with one word per clock, cycle. The 8 words are always within the same SLC cache line. The order of the words transferred is based on the word address field, which is part of the 33-bit requested address. The order of the words transferred may be important to performance, because in the read operation case, the instruction processor is idle until it receives the word it is requesting. The remaining words are not as critical to performance and are known as prefetch data, because they fill out the remaining portion of the instruction processor's cache line.

Since there are two types of SLCs with different cache organization in the preferred implementation, an instruction SLC and an operand SLC, there are also two different word address fields. The instruction SLC has a 5-bit word address field, while the operand SLC has a 3-bit word address field. For the 5-bit word address field, only the upper 3 bits are transferred in the first part of the address, while the lower 2 bits are transferred in the second part. For the operand SLC with a 3-bit word address field, this maps into having the upper bit transferred in the first part and the lower 2 bits in the second part. By doing this type of a split, it helps to optimize the cost/performance of the instruction processor to storage controller function/address interface, where interface size translates into additional cost and additional clock cycles translate into lost performance. The word address bits are transmitted in the appropriate cycles where they arrive just in time to perform their required functionality for both SLCs, but do not hinder the performance of either SLC relative to their operational characteristics.

In the instruction SLC case, the directory is read first prior to the data cache, where the results of a positive comparison is encoded into additional address bits that are used to access the instruction SLC data cache. In other words, the data cache is accessed after the tag search. The instruction SLC cache operates this way because it is implemented with discrete static RAM devices and the pin requirement for accessing the directory in parallel with the data cache would be prohibitive for a four block pre set organized cache. And a direct mapped cache, which has a smaller pin requirement, has a higher miss rate, which translates into lower performance, especially in a shared cache environment. Therefore, there is no requirement from the instruction SLC as to which cycle the various word address bits need to be transferred.

In the operand SLC case, the directory and the data cache are read in parallel. This can be done since, in the preferred embodiment, the operand data cache is implemented inside of an application specific integrated circuit (ASIC), and all connections are high density ASIC interconnections versus external pin connections of the instruction SLC. Also, because of the availability of this high density of interconnection within the data cache, half the cache line can be accessed in parallel, thus deferring the requirement of having the full word address field available at the start of the cache access. Only a single word address bit is required in the first function/address transfer in order to specify which half of the cache line to access first. Which word to transfer back to the requester within the held cache line is not required until a later clock cycle, thus allowing the two least significant word address bits to be transferred on the second clock cycle, thereby minimizing pin requirements on the storage controller.

Finally, the codes of the functions performed by the SLC are arranged into categories such that a particular function consists of two subfields. The first function subfield, which is the most significant 4 bits, specifies the major action to be taken by the storage controller such as read or write or other information that might affect queue priorities, and is required on the first function/address transfer clock cycle. The other function subfield, which is the least significant 3 bits, gives the final attributes of the function that distinguishes it from other functions of the same major action, such as which partial word write field to modify or which duplicate tag block to access. These attributes do not need to be known by the storage controller on the first transfer. The information can be deferred until the second function/address transfer, without any loss in performance.

Given a certain technology with a certain fixed number of signals available, by minimizing the usage of pins on the function/address interface without loss in performance, enables the use of these available resources for other types of parallel signals to be implemented that would have a more positive affect on performance, such as having more requesters directly connected to the storage controller. It should be recognized that pin savings on the function/address interface in a shared SLC environment is multiplied by the number of requesters directly connected to the SLC.

Referring now specifically to FIG. 1, a multiprocessor system 10 is shown embodying the present invention which is housed in Storage Controllers (SCs) 0 and 1 on cards 0 and 1 respectively. Four Instruction Processors (IPs) and an Input/Output Bridge (IO) communicate with the SC on each card. IP0, IP1, IP2, IP3, and IO0 communicate with SC 0 on card 0, and IP4, IP5, IP6, IP7, and IO1 communicate with SC 1 on card 1.

Each SC has two Segment Pair (SP) sections, SP0 and SP1. Each SP is comprised of Input Logic (IL), two Memory Segments (SEG) and a Multiplexer/Communicator (Mux/Com). The Mux/Com provides a multiplex connection and communication means between the various connected elements.

SC0 has SP 0 comprising Input Logic IL 0-2 which communicates with SEG 0 and SEG 2, and Mux/Com 0. SEG 0 and SEG 2 also communicate with Mux/Com 0. SC1 also has SP 1 comprising Input Logic IL 1-3 which communicates with SEG 1 and SEG 3, and Mux/Com 1. SEG 1 and SEG 3 also communicate with Mux/Com 1. SC1 also has SP 0 comprising Input Logic IL 0-2 which communicates with SEG 0 and SEG 2, and Mux/Com 0. SEG 0 and SEG 2 also communicate with Mux/Com 0. Card 1 also has SP 1 comprising Input Logic IL 1-3 which communicates with SEG 1 and SEG 3, and Mux/Com 1. SEG 1 and SEG 3 also communicate with Mux/Com 1.

Mux/Com 0 of card 0 communicates with Mux/Com 0 of card 1 over lines 22, and Mux/Com 1 of card 1 communicates with Mux/Com 1 of card 1 over lines 24.

In SC0, IL 0-2 and IL 1-3 both receive address data from IP0 over lines 12, from IP1 over lines 14, from IP2 over lines 16, from IP3 over lines 18 and from IO0 over lines 20. IL 0-2 transfers data to SEG 0 over lines 11 and SEG 2 over lines 13. SEG 0 transfers data to Mux/Com 0 over lines 19, and SEG 2 transfers data to Mux/Com 0 over lines 21. IL 1-3 transfers data to SEG 1 over lines 15 and SEG 3 over lines 17. SEG 1 transfers data to Mux/Com 1 over lines 23, and SEG 3 transfers data to Mux/Com 1 over lines 25. Similarly SC1, IL 0-2 and IL 1-3 receive address data from IP4 over lines 26, from IP5 over lines 28, from IP6 over lines 30, from IP7 over lines 32 and from IO1 over lines 34. Also on card 1, IL 0-2 transfers data to SEG 0 over lines 27 and SEG 2 over lines 29. SEG 0 transfers data to Mux/Com 0 over lines 35, and SEG 2 transfers data to Mux/Com 0 over lines 37. IL 1-3 transfers data to SEG 1 over lines 31 and SEG 3 over lines 33. SEG 1 transfers data to Mux/Com 1 over lines 39, and SEG 3 transfers data to Mux/Com 1 over lines 41. A more general description of the construction and operation of the instruction processors and addressing scheme may be found in the commonly assigned co-pending U.S. Patent Application which has been incorporated by reference.

Each set of designated lines 12, 14, 16, 18, 26, 28, 30 and 32 have 21 of the total number of lines dedicated to the function/address. This low number of lines is made possible by a two cycle function/address transfer mechanism. Each IL receives address data from connected IPs and transfers the function/address to connected ILs. Both IL 0-2 and IL 1-3 will latch the function/address until the requested operation is complete. A particular segment is selected based on the segment select field of the requested address. The appropriate IL will then route that request to the selected segment. If the requested address is not currently resident in the selected segment, then the function/address is transferred from the segment logic to the local Mux/Com and then on to the remote Mux/Com for further processing. The process of determining the appropriate address destination is described later.

Figure 2B:
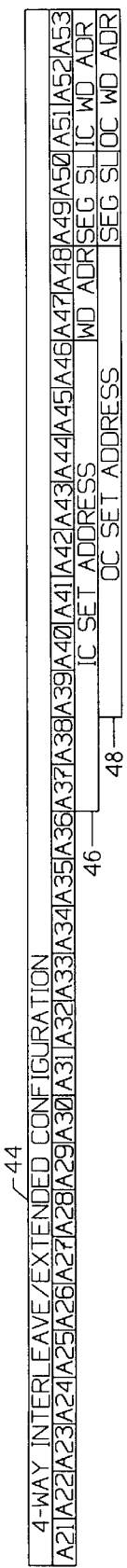
FIG. 2B shows the address format for the 4-way interleave extended configuration.
Figure 2C:
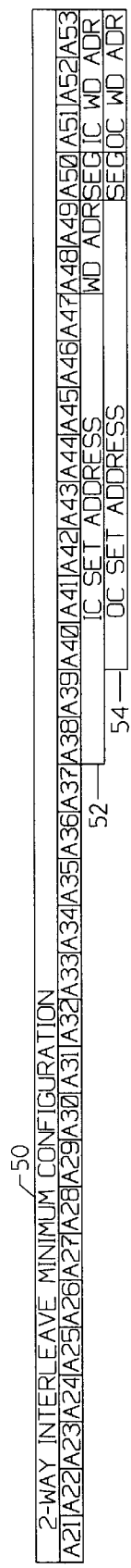
FIG. 2C shows the address format for the 2-way interleave minimum configuration.
Figure 2D:
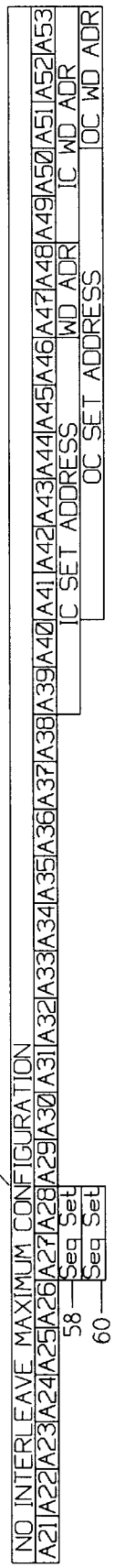
FIG. 2D shows the address format for the no interleave maximum configuration.
Figure 2E:
FIG. 2E shows the address format for the no interleave minimum configuration.
Figure 3:
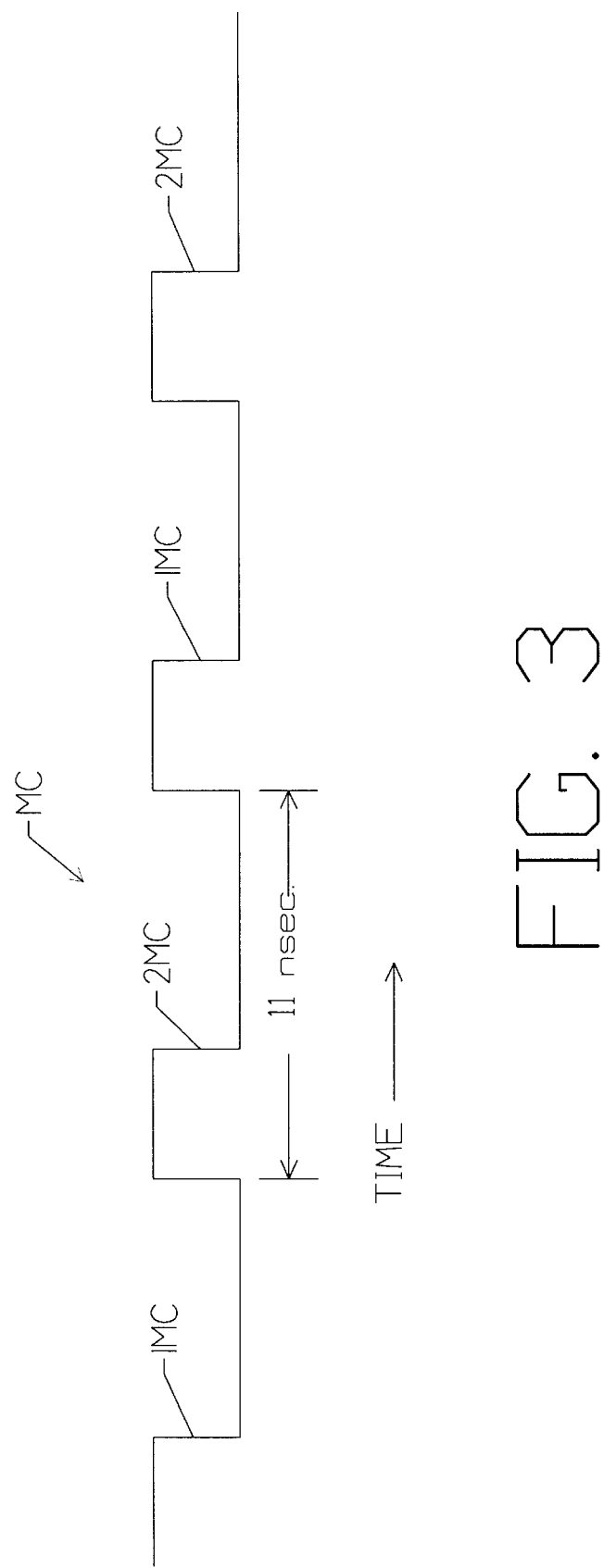
FIG. 3 shows the timing cycles for the first and second minor cycles.

The address formats are shown in FIG. 2A–2E. Address Format 36 for bits 38, numbered 0–20, are transferred as first minor cycle data 40 and as second minor cycle data 42. FIG. 3 illustrates the timing of the Minor Cycle (MC) sequence with each transfer at the following edge of a timing pulse and with each cycle 11 nsec. in length. A first minor cycle, 1 MC, which transmits data 40, is followed by a second minor cycle, 2 MC, which transmits data 42. Timing cycles 1 MC and 2 MC repeat during system operation.

Bits having an F prefix relate to a function and bits having an A prefix relate to an address. The interpretation varies depending upon whether the memory access is interleaved or not and whether the system is a maximum configuration, such as the Unisys MC system, or a minimum configuration, such as the Unisys EC configuration. The memory addressing scheme for all of these systems is described in the related referenced application.

For the 4-Way Interleave Extended Configuration 44 the Instruction Cache Set Address (IC SET ADDRESS), the Word Address (WD ADR), the Segment Select (SEG SL), and the Instruction Cache Word Address (IC WD ADR) portions are indicated on line 46. The Operand Cache Set Address (OC SET ADDRESS), SEG SL, and the Operand Cache Word Address (OC WD ADR) portions are indicated on line 48.

For 2-Way Interleave Minimum Configuration 50 the IC SET ADDRESS, WD ADR, Segment Select (SEG), and IC WD ADR are indicated on line 52. The OC Set Address, SEG, and OC WD ADR are indicated on line 54.

For No Interleave Maximum Configuration 56 the Segment Select (Seg Sel), IC SET ADDRESS, WD ADR, and IC WD ADR are indicated on line 58. The Seg Sel, OC SET ADDRESS, and OC WD ADR are indicated on line 60.

For No Interleave Minimum Configuration 62 Segment Select (Seg), IC SET ADDRESS, and IC WD ADR are indicated on line 64. The Seg, OC SET ADDRESS, and OC WD ADR are indicated on line 66. As can be seen from these various sub-headings, the classes of information provided is the same for all addressing schemes.

Figure 4:
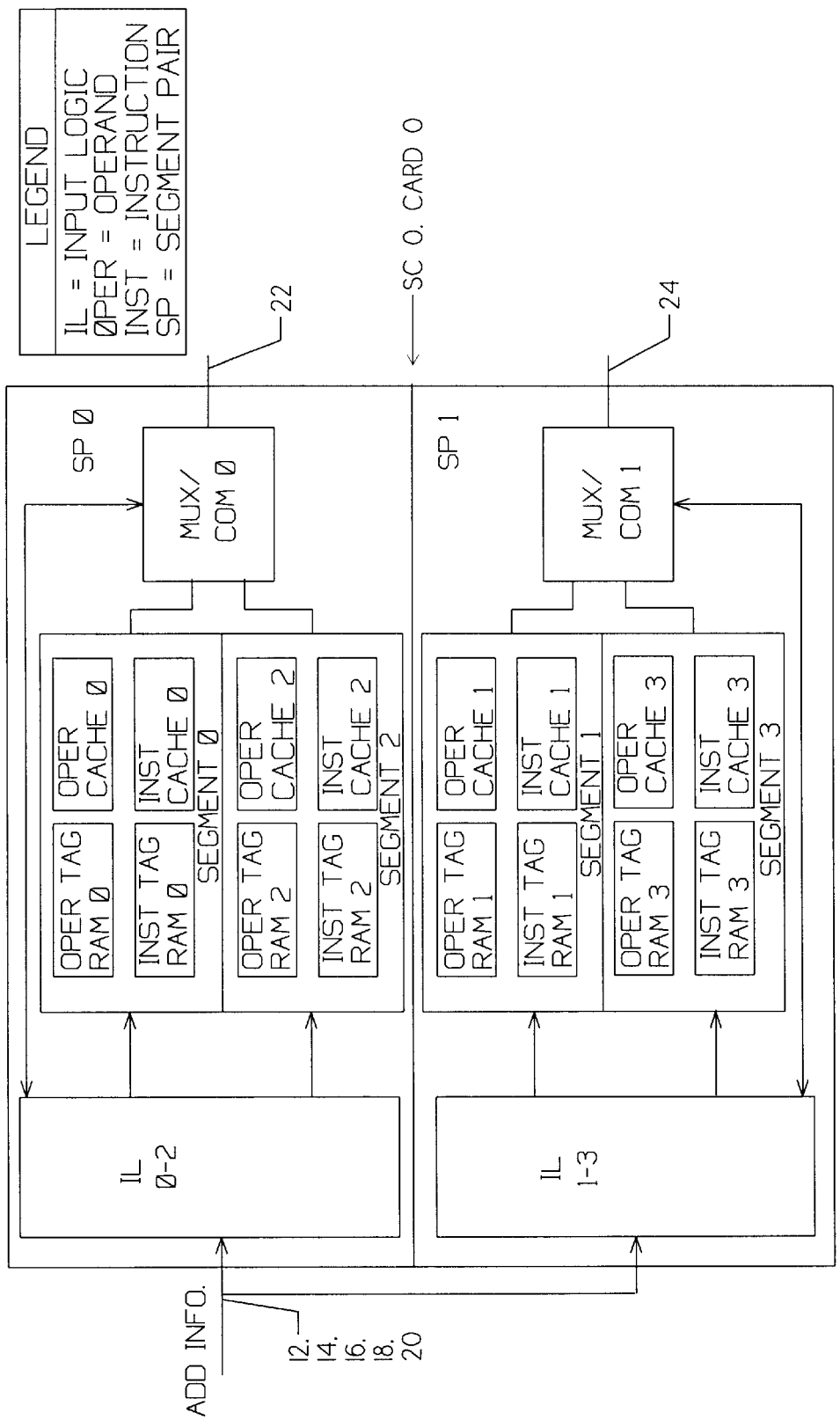
FIG. 4 is a simplified block diagram showing the elements of both storage controllers on a single chip.

Data 40 and 42 are sequentially forwarded by input logic to tag logic which communicates with the cache being addressed. The relationship between the Input Logic, the Tag RAMS and Caches for card 0 is shown in FIG. 4. SP 0 includes IL 0-2 interfacing with memory segments (SEGs) 0 and 2. A Multiplexer/Communicator combination MUX/COM 0 is connected to both SEG 0 and 2, to IL 0-2, as shown, and to MUX/COM 0 on Card 1 to provide both interconnection and communication means between these various elements. Within SEG 0 Oper Tag RAM 0 communicates with Operand (Oper) Cache 0 and Instruction (Inst) Tag RAM 0 communicates with Inst Cache 0. Within SEG 2 Oper Tag RAM 2 communicates with Oper Cache 2 and Inst Tag RAM 2 communicates with Inst Cache 2.

SP 1 includes IL 1-3 interfacing with SEGs 1 and 3. Within SEG 1 Oper Tag RAM 1 communicates with Oper Cache 1 and Inst Tag RAM 1 communicates with Inst Cache 1. Within SEG 3 Oper Tag RAM 3 communicates with Oper Cache 3 and Inst Tag RAM 3 communicates with Inst Cache 3. Card 1 is similarly structured.

Figure 5:
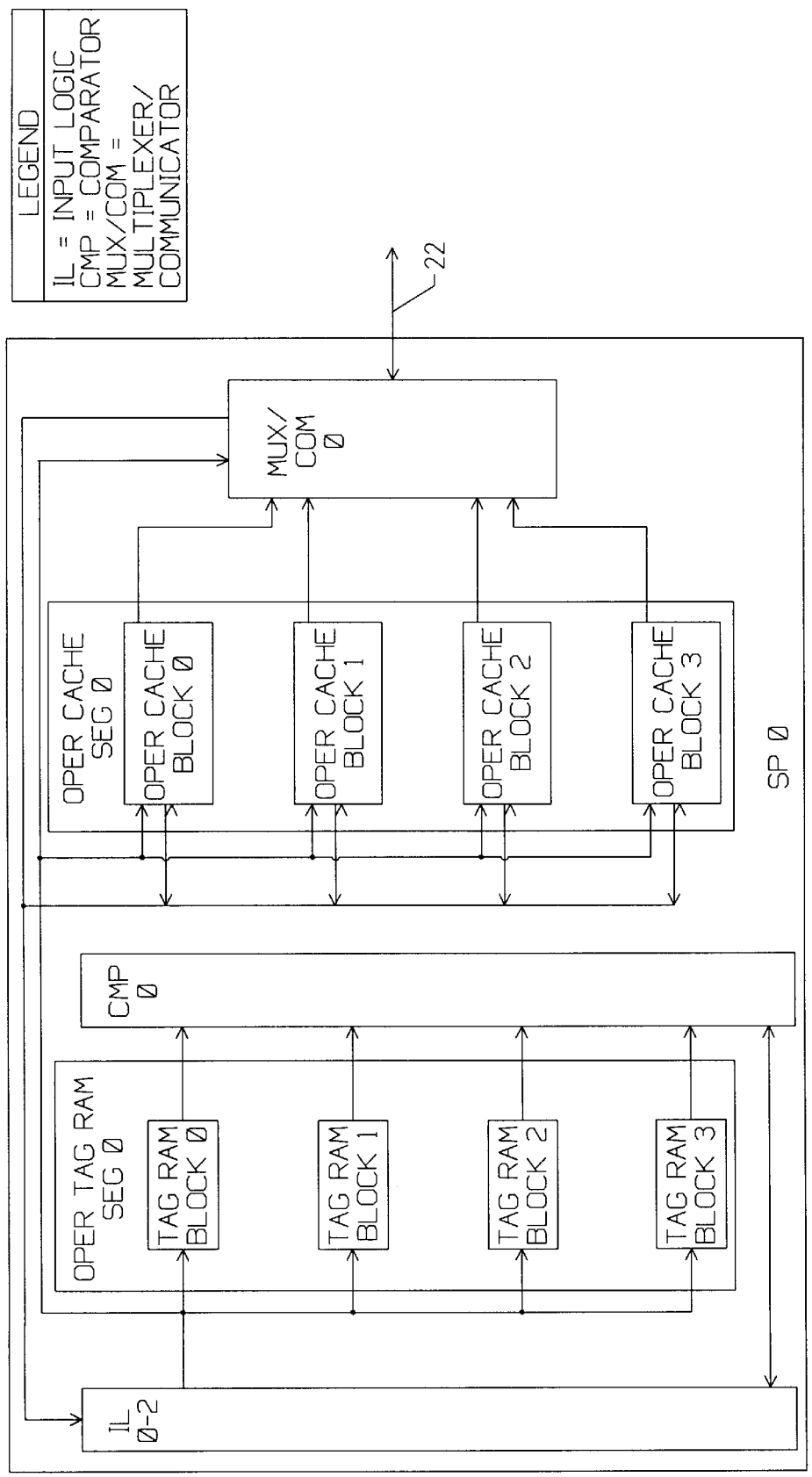
FIG. 5 is a further simplified block diagram showing elements of a single storage controller and operand cache.

Segment 0 is shown in FIG. 5. Here only the related elements of Segment 0 for the Operand RAM and Cache segments are shown. Both the Operand (Oper) Tag RAM Seg 0 and Oper. Cache Seg 0 are divided into four Blocks. Each Tag RAM Block is structured here into the logical equivalent of four 1K×30 bit tag RAMS. This arrangement is used because four data Cache blocks are addressed by the Tag RAM Block.

Each Oper Cache has 1K sets×4 block/set×8 (36 bit) words for a total of 32K words. By comparison, each instruction cache, not shown, has 1K sets×4 blocks/set×32 (36 bit) words for a total of 128K words.

Oper Tag RAM Seg. 0 has Tag Ram Blocks 0, 1, 2, and 3, and Operand Cache Seg. 0 has four Operand Cache Blocks 0, 1, 2 and 3. The instruction Tag RAMS and Cache organization are similar, with the difference between the two being the size of the caches and the longer required address word length. Since only the operand arrangement and operations affected the address format as mentioned earlier, only the operand connections and operations for this one segment have been described here. Further, since cards 0 and 1 are arranged identically only elements related to SC 0 of card 0 are described here.

IL 0-2 communicates with Tag Ram Segment 0, Oper Cache Segment 0, Comparator (CMP) 0, and MUX/COM 0. Inst. Tag RAM Blocks 0, 1, 2 and 3 of Oper Tag Ram Seg. 0 all communicate with IL 0-2 and CMP 0 as shown. Oper Cache Seg. 0 Blocks 0, 1, 2 and 3 all communicate with IL 0-2 and MUX/COM 0. IL 0-2 provides the communication between the Tag RAM Blocks, the Cache Blocks, CMP 0 and MUX/COM 1 as shown. The arrangement of IL 0-2 with Seg. 2 is similar to that with Seg. 0 and the arrangement of IL 1-3 with respect to SEG 1 and 3 is the same.

In operation in SP 0, Seg 0, Tag Ram 0 is associated with Oper. Cache 0, and Inst. Tag RAM 0 is associated with Inst. Cache 0; SEG 2 Oper Tag RAM 0 is associated with Oper. Cache 2, and Inst. Tag RAM 2 is associated with Inst. Cache 2. In SP 1, not shown, SEG 1 Oper. Tag RAM 1 is associated with Oper Cache 1, and Inst. Tag RAM 1 is associated with Inst. Cache 1; SEG 3 Tag RAM 3 is associated with Oper. Cache 3, and Inst. Tag RAM 3 is associated with Inst Cache 3. In SP 0 and SP 1 on Card 1 the arrangement is similar excepting for connections to different instruction processors. An instruction and operand RAM and Cache are provided in each of the four memory segments although only the Instruction Ram and Cache of Segment 0 of Card 0 for the reasons given above.

CMP 0 is arranged to step through each Block and compare the requested address of a Tag RAM with the RAM address content. In order to reduce the amount of time required for this comparison process, the CMP 0 steps through all four blocks simultaneously.

In operation first and second minor cycle transfers from any of processors IP0, IP1, IP2 or IP3 sequentially transfers data 40 and 42 of FIG. 2A to IL 0-2 and IL 1-3 as shown in FIG. 3 on successive transfers of the First Minor Cycle (1MC) and the second Minor Cycle (2MC).

As described earlier, lines 12, 14, 16, 18 and 20 carry this information to IL 0-2 and IL 1-3. This is interpreted by IL 0-2 and IL 1-3 which then transfer the received address data only to logic communicating with the designated memory segment, with references to SEG 0 or SEG 2 being transferred to the appropriate segment by IL 0-2, and references to SEG 1 or SEG 3 being transferred to the appropriate segment by IL 1-3. This is described in detail later. As noted in the description of data words 40 and 42 of FIG. 2A, these words can address either operands or instructions.

Each Tag RAM word of 30-bits contains address bits A21 through A-40 of an 8-word block of main memory that has been stored in the respective communicating Cache. The address of the cached 8-word block has a tag address which matches the Tag RAM address. The 30-bit word, in addition to 20 address bits, stores 10 other bits which include: 6 bits of error correction code (ECC), and a valid (V) bit, and an O, W, and B bit indicating memory ownership and the most recent data.

The operation of the Tag RAM is illustrated in the following example. Assume that operand data was read from the Main Storage Unit (MSU) into Block 0 of the SEG 0 Operand Cache and that the 4-Way Interleaved/Extended Configuration 44 of FIG. 2B is the system in use. If the access address (A21–A53) is 000002000h (hexadecimal) the address bits within the range A39–A48 are therefore 100h, the Set Address for the 4-Way Interleaved Configuration. Address bits A21–A40 for this address are 00001h. Therefore, "00001" will be stored at address 100h, along with the additional 10 bits of information in the Tag RAM associated with Block 0 of the Seg 0, Oper Cache. The next time this address is accessed, the set address will be applied to this Tag RAM to read the A21–A40 value of "0".

As mentioned above, during a request the Set Address is applied to the entire Tag Ram structure. Therefore four addresses (containing A21–A40 are read from the four Tag RAMs Blocks 0, 1, 2 and 3 associated with Seg. 0. As shown in FIG. 5, each of the four addresses read from the Tag RAMs are sent to CMP 0 to be compared with A21–A40 of the current access address. If none of the four addresses match the access address, a cache "miss" has occurred. No data is selected from the resident memory Blocks, and the request is routed to remote Card 1 via lines 22 to determine if the requested data has been cached there.

The cache memory structure allows accesses to the Tag RAMS and Cache to occur at the same time the second minor cycle of data is being transferred. Using the above example it can be seen that address bits A27–A51 are included in data 40 transferred during the first minor cycle. The Set Address, A39–A48, contained in the first minor cycle, is applied to the Tag RAMs, and bits A39–A48, A51 are applied to the Cache RAMS, at the same time the second data cycle is transferring data word 42 containing bits A21–A26, A29–A36, and A52–A53. When the second-cycle address portion (A21–A40) become available to the compare logic, the address portion from the Tag logic is already set up. The address compare and selection requires only nanoseconds to determine if a cache hit occurred. Since the data for half of the cache line has already been read from each of the four data blocks during the second data transfer and is set up at the input of MUX/COM 0, the data from the selected block becomes available upon propagating through the MUX/COM 1 which requires only nanoseconds.

Data is read from the operand data cache in half cache line increments or 4 words in parallel in one clock cycle. Data is always delivered to the requester on a full cache line basis, one word every clock cycle. Within the 8 word cache line, A51–A53 of line 48 specifies the first word to be transferred back to the requester. As seen from line 42, A52 and A53 are not available until after the second address cycle. However, since the operand data cache read 4 words in parallel, only the most significant bit of the word address field, bit A51 of line 40, is required at the start of the cache access. The selection of the first word within the half cache line can be deferred by a clock cycle, since there is a latency of one clock cycle to read the operand data cache. The system performance is not negatively impacted by the unavailability of A52 and A53 until function address information 42 is transferred during the second minor cycle.

If the above example was for an instruction address rather than an operand address, the operation would have been different, but this difference has no additional requirements on the address order of bits A51, A52 and A53 of lines 40 and 42. In the instruction cache case, two words are read in parallel and therefore it take 4 clock cycles to read the cache line. The instruction tag is read prior to accessing the instruction data cache, because the compare information is used as part of the addressing of the instruction data cache. Since the tag sequence takes a clock cycle anyway, the instruction cache does not require any of the word address bits to be transferred on the first clock cycle. The instruction data cache operates this way because it is implemented in using discrete static RAMs rather than embedded static RAMs within the ASIC like the operand data cache and all the tags. The pin requirements on the ASICs to handle more parallelism like the operand data cache would be too cost prohibitive.

Figure 6:
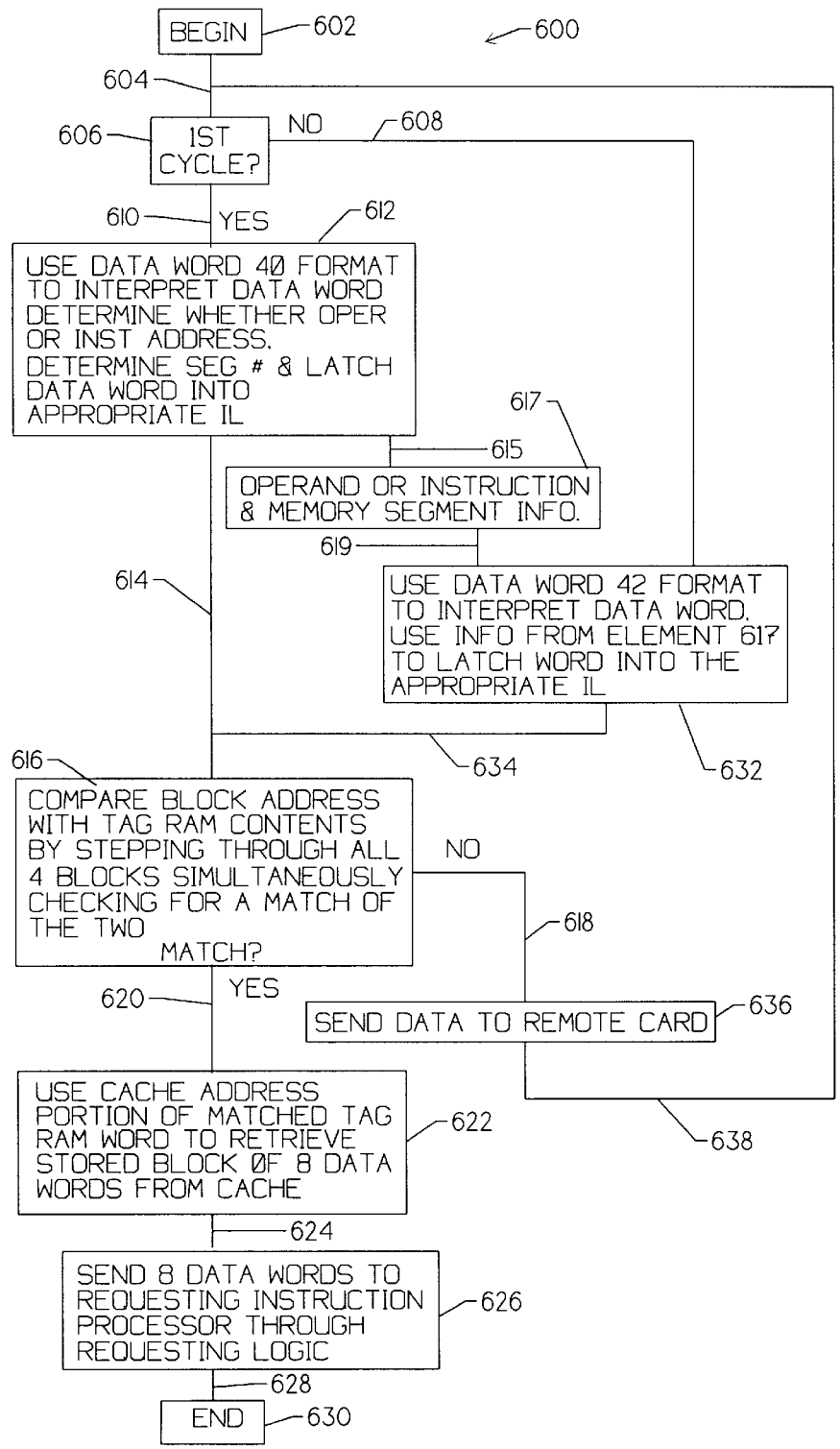
FIG. 6 is a flow diagram showing an exemplary method of the present invention.

FIG. 6 is a flow diagram for the operation of FIG. 5 This is representative of the process for all of the Tag RAMs and Cache Blocks for both instruction and operands on both cards since, as noted before, the operation of both are essentially identical. The following description of the instruction operation therefore also applies to operands, with the exception of the word address length and interpretation, because instructions and operands differ in the number of words cached in each block as described earlier.

The diagram is generally shown at 600. This diagram indicates the logic operation on data words 40 and 42 of FIG. 2A. This exemplary example incorporates the structure of the system as shown in FIGS. 1, 4, and 5, using the word format for a 4-Way Interleaved/Extended Configuration 44 of FIG. 2B, and the timing of FIG. 3.

Flow diagram 600 describes word address processing. Processing for addresses of both instructions and operands are shown with both cards 1 and 2 which operate in the same manner. Only the address word length, cache size and bit locations are changed when processing addresses for operands rather than instructions. The cache size and bit locations for instructions and operands were described earlier.

This example assumes that IP 0 of card 0 is issuing an instruction address relating to Segment 0 which communicates with IL 0-2 however the flow diagram also applies to the other instruction processors, the other card, operand logic, and the other memory segments.

The flow diagram is entered at element 602, wherein control is passed to element 606 via interface 604. Element 602 is entered whenever an Instruction Processor issues word 40 or 42 on either SP0 or SP1 and activates a request control line for one minor clock cycle to connected ILs. Control is passed to element 606 via interface 604. Element 606 determines: 1 R St. Cycle? by the request control line being active. Word 40 or 42 is provided to both IL 0-2 and IL 1-3. For the second minor cycle, control is passed to element 632 via interface 608. The operation of element 632 is described later.

If a first minor cycle, control is passed to element 612 via interface 610. Element 612 uses data word 40 format to interpret the data word, to determine whether an operand or an instruction address and use segment select bits to latch the word into the appropriate input logic. The first minor cycle format applies here since this was determined previously in element 606. Bits A49 and A50 are used to determine the memory segment, and function bits F0, F1, F2 and F3 are decoded to determine whether an instruction or operand address is requested. In this example, SEG 0 is being addressed, and the address is for an operand. This will then cause bits A39 through A48 to be used as the Set Address for the Tag RAM and IL 0-2 to latch data word 40. The instruction or operand determination and the memory SEG addressed is sent to element 617 via interface 615. Element 617 sends the Memory SEG information to element,632 via interface 619 for use later when the 2nd minor cycle data word 42 is transmitted. Control is then passed to element 616 via interface 614.

If element 606 determined that this is a 2nd minor cycle then control is passed to element 632 via interface 608. The information from element 617, provided on the previous first minor cycle, is available for use in element 632 on the 2nd minor cycle. Element 632 uses data word 42 format to interpret the data, the operand or instruction address information and the memory segment information to latch the word into the appropriate IL, as described earlier. Control is then passed to element 616 via interface 634.

Element 616 compares the Block Address, A21-A38, with the stored Tag RAM block address by stepping through all 4 Operand Blocks simultaneously. Element 616 uses the IL having the latched data to direct the communicating CMP to step through all 4 addressed Tag RAM blocks simultaneously looking for a Block address match with the requested address. Since both instruction cache tag and operand cache tag are accessed at the same time, line 46 format is routed to the instruction cache, while line 48 format is routed to operand cache tag. In this example, CMP 0 checks all four Blocks 0, 1, 2 and 3 of Operand Cache Seg 0 simultaneously 0 looking for a match.

If no match is found, control is passed to element 636 via element 618. Element 636 Sends the data to the remote card by causing the IL to transfer the data word to the remote MUX/COM from the local MUX/COM. In this example IL 0-2 would transfer data word 40 or 42, depending upon whether the first or second minor cycle was being interpreted, from IL 0-2 to MUX/COM 0 and from there to MUX/COM 1 over lines 22. This will cause IL 0-2 and IL 1-3 of card 2 to repeat the same process beginning with element 606.

If a match is found in element 616, control is then passed to element 622 via interface 620. Element 622 uses the Cache address portion of the matched Tag Ram word to retrieve 8 data words from the addressed Cache. In this example IL 0-2 would enter Oper Cache Block 0 and retrieve the addressed eight word data block. Control is then passed to element 626 via interface 624.

The IL then sequentially sends the 8 word data block to the requesting instruction processor. In this example IL 0-2 would send the retrieved data words to IP 0.

Control is then passed to element 630 via interface 628. Element 630 ends the process until the next request is received by the SC. The information provided to element 632 from element 617 remains until overwritten so the second minor cycle will always have information determined from the previous first minor cycle.

This same process applies to both cards and to all logic operations whether for instructions or operands. The described process was for operands, however the process is similar for instructions, only the interpretation of the requesting address and the Cache sizes are different, to reflect that different addresses are used and the different size of the caches as discussed earlier.

This approach, which overlaps the interpretation and response of a first data word in a first minor cycle, during the time a second data word is being transmitted in a second minor cycle, reduces the response time by an which essentially offsets the use of two data word transmissions for cache data retrieval.

Having thus described the preferred embodiment of the present invention, those of skill in the art will readily appreciate that the teachings found herein may be applied to yet other embodiments within the scope of the claims herein attached.

What is claimed is:

1. In a data system including at least one first apparatus having caches and including at least one second apparatus which stores data into and reads data from the first apparatus caches, the improvement comprising:
   a) the first apparatus having tag memory means for storing cache addresses;
   b) means for transmitting address information and function information from the second apparatus to the first apparatus in a data set of two data words, a first data word containing a tag memory address and a first cache address portion, a second data word containing a second cache address portion;
   c) logic means for controlling said tag memory means and the caches by using said first data word to obtain a partial cache address from said tag memory means and to read data from the caches, said logic means comparing said partial cache address with said first cache address portion and said second cache address portion, a match between said partial cache address and said first cache address portion and said second cache address portion confirming the presence of said partial cache address within said caches, said data read from said caches being available when the presence of said partial cache address is confirmed.

2. The data system of claim 1 wherein said logic means further comprises:

a) determining means for determining whether said partial cache address is within a cache address range;
   b) latching means for latching said data words of said data set for further processing when said partial cache address is within said cache address range;
   c) function determining means, operative when said partial cache address is within said cache address range, for determining the transmission function of said data set;
   d) write means, operative when said partial cache address is within said cache address range and when the function is for a write operation, for writing said data following said data words in designated cache address locations;
   e) read means, operative when said partial cache address is within said cache address range and when the function is for a read operation, for reading said data from the designated addresses in the caches, and transmitting said data to the requesting second apparatus.

3. The data system of claim 2 wherein the first apparatus further comprises retransmitting means for transmitting data received from the second apparatus whenever said partial cache address is not within said cache address range of the first apparatus caches.

4. The data system of claim 3 wherein the second apparatus further includes means for transmitting each data word of said data set to the first apparatus successively and in synchronism with a first repeating timing signal having a predetermined timed cycle; and wherein the first apparatus further comprises means for successively receiving and latching said data words of said data set in synchronism with a second timing signal having the same timing cycle as said first timing signal but delayed therefrom a first predetermined amount of time; and wherein said first apparatus retransmitting means further comprises an apparatus for transmitting said data words of said data set to another first apparatus in synchronism with a third repeating timing signal, each signal having the same timing cycle time as said first timing signal but delayed therefrom a second predetermined amount of time which is greater than said second delay.

5. A data system comprising:
   a) at least a first apparatus having caches and tag memory apparatus;
   b) at least a second apparatus;
   c) said first and said second apparatus having a transmission apparatus arranged to transfer data words there between arranged such that said second apparatus can store data in and read data from said caches, and such that address and function information can be transmitted from said first apparatus to said second apparatus in a data set of two data words, a first data word containing a tag memory address and a first cache address portion, a second data word containing a second cache address portion;
   d) said first apparatus having a logic apparatus arranged to obtain a partial cache address from said tag memory and to read said data from said caches, and compare said partial cache address with said first cache address portion and said second cache address portion for a match to confirm the presence of said partial cache address within said caches, said data read from said caches being available when the presence of said partial cache address is confirmed.

6. The data system of claim 5 further comprising:
   a) determining apparatus which determines whether said partial cache address is within a cache address range;

b) latching apparatus which latches said data words of said data set for further processing when said partial cache address is within said cache address range;

c) function determining apparatus, operative when said partial cache address is within said cache address range, for determining a transmission function of said data set;

d) write apparatus, operative when said partial cache address is within said cache address range and when the function is for a write operation, for writing said data following said data words in designated cache address locations;

e) read apparatus, operative when said partial cache address is within said cache address range and when the function is for a read operation, for reading said data from the designated addresses in said caches and transmitting said data to the requesting second apparatus.

7. The data system of claim 6 wherein said first apparatus further comprises a retransmitting apparatus which transmits data set information received from said second apparatus whenever said partial cache address is not within said cache address range.

8. The data system of claim 7 wherein said transmission apparatus transmits each data word of said data set from said second apparatus to said first apparatus successively and in synchronism with a first repeating timing signal having a predetermined timed cycle; and wherein said second apparatus successively receives and latches said data words of said data set in synchronism with a second timing signal having the same timing cycle as said first timing signal but delayed therefrom a first predetermined amount of time; and wherein said retransmission apparatus transmits said data words from said first apparatus to another first apparatus in synchronism with a third repeating timing signal, each signal having the same timing cycle time as said first timing signal but delayed therefrom a second predetermined amount of time which is greater than said second delay.

9. A method of operating a data system, the method comprising the steps of:

a) providing at least one first apparatus having caches and a tag memory apparatus;

b) providing at least one second apparatus;

c) providing a transmission apparatus arranged to transfer data words between said first apparatus and said second apparatus arranged such that said second apparatus can store data in and read data from said caches, and such that address and function information can be transmitted from said second apparatus to said first apparatus in a data set of two data words, a first data word containing a tag memory address and a first cache address portion, a second data word containing a second cache address portion;

d) providing a logic apparatus to obtain a partial cache address from said tag memory and to read data from said caches, e) transmitting a first data word from said second apparatus to said first apparatus;

f) reading said partial cache address from said tag memory;

g) reading said data from said caches; and h) comparing said partial cache address with said first cache address portion and said second cache address portion for a match to confirm the presence of said partial cache address within said caches, said data read from said caches being available when the presence of said partial cache address is confirmed.

10. The method of claim 9 further comprising the steps of:

a) providing a determining apparatus for determining whether said partial cache address is within a cache address range;

b) providing a latching apparatus for latching data words of said data set for further processing when said partial cache address is within said cache address range;

c) providing a function determining apparatus, operative when said partial cache address is within said cache address range, for determining the transmission function of said data set;

d) providing a write apparatus, operative when said partial cache address is within said cache address range and when the function is for a write operation, for writing said data following said data words in designated cache address locations;

e) providing a read apparatus, operative when said partial cache address is within said cache address range and when the function is for a read operation, for reading said data from designated addresses in said caches, and transmitting said data to the requesting second apparatus;

f) determining whether said partial cache address is within said cache address range;

g) latching said data words of said data set for further processing when said partial cache address is within said cache address range;

h) determining said transmission function of said data set if said partial cache address is within said cache address range;

i) writing said data following said data words in designated cache address locations, if said partial cache address is within said cache address range and the function is for said write operation; and j) reading said data from said designated addresses in said caches, and transmitting said data to the requesting second apparatus if said partial cache address is within said cache address range and the function is for said read operation.

11. The method of claim 10 further comprising the steps of:

a) providing a retransmitting apparatus for transmitting data set information received by said first apparatus from said second apparatus whenever said partial cache address is not within said cache address range; and b) transmitting said data set information received from said second apparatus if said partial cache address is not within said cache address range.

12. The method of claim 11 further comprising the steps of:

a) transmitting each data word of said data set from said second apparatus to said first apparatus successively and in synchronism with a first repeating timing signal having a predetermined timed cycle;

b) latching said data words of said data set in said first apparatus in synchronism with a second timing signal having the same timing cycle as said first timing signal but delayed therefrom a first predetermined amount of time; and c) transmitting said data words from said first apparatus to another first apparatus in synchronism with a third repeating timing signal if said partial cache address is not within said cache address range, each signal having the same timing cycle time as said first timing signal but delayed therefrom a second predetermined amount of time which is greater than said second delay.

* * * * *